Dec. 26, 1950 O. KORNEI 2,535,498

ERASING HEAD AND APPARATUS FOR MAGNETIC RECORDERS

Filed Nov. 7, 1947 2 Sheets-Sheet 1

INVENTOR.
O. KORNEI
BY Michael S. Pineles
ATTORNEY

INVENTOR.
O. KORNEI
BY Michael S. Pinales
ATTORNEY

Patented Dec. 26, 1950

2,535,498

UNITED STATES PATENT OFFICE 2,535,498

ERASING HEAD AND APPARATUS FOR MAGNETIC RECORDERS

Otto Kornei, Cleveland Heights, Ohio, assignor to The Brush Development Company, Cleveland, Ohio, a corporation of Ohio Application November 7, 1947, Serial No. 784,563

8 Claims. (Cl. 179—100.2)

This invention relates to magnetic record transducing systems, and more specifically to that type of magnetic record transducing systems in which a permanent magnet arrangement is used for preparing the successive elements of the record track for receiving a recording.

Among the objects of the invention are novel magnetic record transducing systems including simplified permanent magnet record obliterating means.

Further objects of the invention include magnetic record transducing systems in which the record obliterating means contains a minimum of parts yet properly prepares the elements of the record track to receive A. C. biased recordings.

The foregoing and other objects of the invention will be best understood from the following description of an exemplification thereof, reference being had to the accompanying drawing, wherein.

Magnetic record transducers with permanent magnet obliterating heads have been known in the art, but these heads have usually been limited to constructions in which recordings are applied to the record track elements with a superimposed D. C. magnetic flux. In such arrangements recordings are made along a relatively straight-line portion of the magnetization characteristics of the record track by first magnetically saturating the elemental portions of the track and then biasing the record flux signals with a D. C. flux which causes the recording to center about a straight portion of the hysteresis loop. This type of obliteration and recording is inherently accompanied by a relatively high noise level inasmuch as any slight non-uniformity in the magnetic linkage or in the record track produces large amounts of leakage flux in the record track. Permanent magnet preparation of record tracks for receiving A. C. biased recordings has not been previously found very practical beacuse the A. C. biased signals are best recorded on de-magnetized record tracks using the ability of a high frequency alternating flux to collapse the hysteresis loops of the record track elements, so that a substantially straight magnetization curve takes the place of the unbiased magnetization curve with its sharp knee. Unfortunately, de-magnetization is not easily effected with permanent magnets. The normal de-magnetization requirements are at best six reversals of magnetization with progressively decreasing flux densities, and an excessive number of magnets is required for these reversals.

The magnetic record transducing apparatus of the invention utilizes permanent magnet erasing heads having as few as two permanent magnets arranged to subject the elements of the record track to magnetic fields which leave them excellently suited for receiving recordings with A. C. bias.

Figure 1:
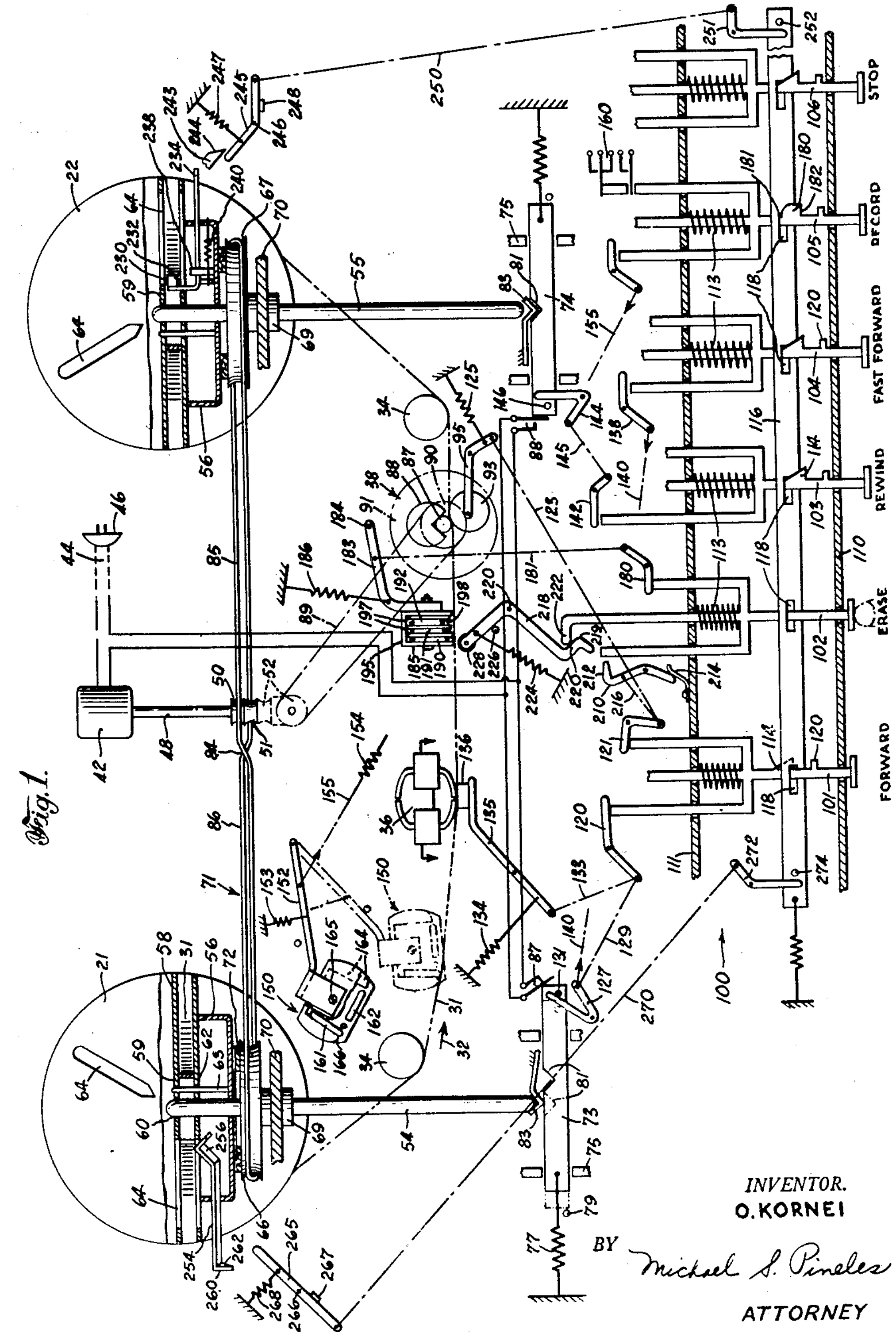
Fig. 1 is a diagrammatic showing partly in section and partly in elevation of the essential elements of a magnetic record transducing assembly exemplifying the invention.

Fig. 1 is a diagrammatic showing of the essential elements of one form of magnetic transducing system of the invention. A permanently magnetizable elongated record member, such as a wire or tape, is held in coiled form on the supply reel 21 and arranged for unwinding from the supply reel and coiling onto a take-up reel 22 by suitable impelling structures such as those shown. In moving between the reels, as for example, in the direction of the arrow 32 for performing a transducing operation, the record track 31 is led along a guide path over guide rollers 34, a magnetic record transducing head 36 and a capstan drive, generally indicated at 38. In the form shown, movement of the record track 31 is provided by an electric driving motor 42 energized through a connector cable 44 and provided with an "on-off" switch, not shown, and a connector plug 46 which may be fitted into conventional electric power supply outlets. A rotatable shaft 48 of the driving motor 42 is shown as provided with a plurality of pulleys 50, 51, 52 for transmitting the desired impelling forces from the motor to the reels 21, 22 and capstan drive 38.

The reels 21, 22 are shown as mounted on reel shafts 54, 55 provided with collars 56 secured to the shaft and forming dished table-like supports for the reels. The reels themselves are shown as including a peripheral flange portion 58 in which the record track 31 is stored and a central hub portion 59 by which they are held on the shafts 54, 55. A central opening 60 in the hub portion may be arranged to fit over the upper ends of the shafts 54, 55 and a similar adjacent passageway 62 may be provided in the hub 59 for receiving a drive pin 63 secured to the reel table 56 and providing an impelling connection between the reel and the shaft. Slots 64 may be provided in the flange portion 58 for permitting ready observation of the record track stored on the reel. The reel shafts 54, 55 are rotatably and slidably journalled in the bearing members 69 secured to a fixed mounting surface, such as the wall portions 70 shown broken away. The bearing member 69 also rotatably holds reel driving pulleys 66, 67 independently of the reel shafts 54, 55 so that the reel drive pulleys 66, 67 may be rotated without driving the reel shafts 54, 55, respectively. Friction pads 72 are shown as inserted between each reel drive pulley 66, 67 and the adjoining surface of the reel tables 56 so that when the reel tables are biased toward the corresponding reel drive pulley a frictional driving engagement between the pulley and the corresponding reel is effected. However, when either reel table is disengaged from its friction pad, and/or its drive pulley as by raising the slidable reel shaft on which the table is held, the driving interconnection between the reel driving pulley and the reel is broken and the reel driving pulley may be freely rotated without impelling the reel. The friction pads 72 may be of felt, cork or similar composition.

In the form shown in Fig. 1, the friction drive control is established by means of a pair of clutch operating slides 73, 74 guided for sliding along the guide surface 75, and biased as by springs 77 to outer drive engaging position against stops 79. In their outer drive engaging position the clutch slides 74, each of which has a pocket 81 in its upper surface, receives and permits downward movement of a reel shaft socket 83 which may be of spring-like construction held and biased toward the downward position as shown. The sockets 83 have cup-shaped portions for engagement with the lower rounded ends of the reel shafts 54, 55 and in the drive engaging position in which the slide 74 is shown, the lowered positions of the sockets 83 permit the downward movement of the reel shafts 54, 55 under the influence of its own weight, for example, together with the weights of the reels mounted on them to bring the reel tables 56 in frictional driving engagement with the respective pulleys 66, 67, through the friction pads 72. Actuation of either of the clutch slides 73, 74 in inward direction against its bias 77, forces the overlying reel shaft socket 83 out of its receiving pocket 81 simultaneously camming it upwardly, bringing it into engagement with and raising the associated reel shaft. This separates the reel table on that shaft from the corresponding reel driving pulley breaking the driving interconnection.

As shown, the reel driving pulleys 66, 67 are interconnected for operation by the single driving motor 42 by a drive belt 71 looped around the reel shaft pulleys 66, 67 and engaging the motor shaft pulleys 50, 51. The drive belt 71 is crossed, as indicated at 84, so that the reel driving pulleys are rotated in opposite directions. The looped portions 85, 86 of the belt 71, on opposite sides of the cross-over 84, are driven by the motor by mounting the motor-shaft pulley within one loop so that each pulley 50, 51 engages a different arm of the same loop 85, and both pulleys are wedged toward the cross-over point. The engaged arms of the loop contact the respective motor pulleys 50, 51 on opposite sides as shown. The above driving arrangement forms a very compact and simple assembly in which the operation of the motor impels the reel shaft pulleys 66, 67 in opposite directions and the record track may be reeled either in the forward transducing direction 32 or in a rewind direction by simply operating one of the clutch slides 73, 74 to break the drive connection to the corresponding reel, thereby permitting unwinding of the record track from the disengaged reel and impelling of the other reel to wind the record track thereon. Energization of the drive motor 42 may be interconnected with the clutch controls as by switches 87, 88 mounted in the path of travel of the respective clutch slides 73, 74 enclosing a circuit for supplying energy to the motor 42. By this arrangement, each time one of the clutch slides 73, 74 is operated inwardly to disengage a reel from the drive assembly, the driving motor 42 is energized to impel the other reel.

The record track 31 is impelled in the forward or transducing direction 32 by the capstan 38, which in the form shown includes a relatively thin capstan shaft 87 supported against a backing bearing member 88 and rotated as by the driving belt 89 looped over motor shaft pulley 52 and a capstan pulley shown by the dash line 90, and positioned below the driving portion of the capstan. The capstan shaft 87 is also provided with a relatively high inertia flywheel portion 91 which may be any disc-like form of relatively large diameter. The backing bearing 88, which is fixed and is notched, as indicated at 92, for rotatably receiving the capstan shaft 87 may be of a suitable self-lubricating construction, as for example by forming it of lubricant impregnated porous metal such as oilite or graphite. The relatively small diameter of the capstan shaft 87, which may be of the order of one-quarter inch or even less, enables it to be driven at fairly high speeds comparable to those of conventional electric motors for impelling the record track 31 at the conventional linear speeds which for the finely divided magnetizable powder-containing record tracks is of the order of eight inches per second. Furthermore, the relatively high speed of capstan rotation permits use of a flywheel 91 of relatively smaller mass. Thus, for example, the flywheel 91 may be formed of three identical stamped metal sheets, each rotated 120° apart and secured together so that any inaccuracy in the stamping of the individual sheets will be balanced out. The small rounded surface of the capstan shaft 87 is brought into effective driving engagement with the record track 31 by a pressing roller 93 rotatably held on the pivoted arm 95 for movement toward or away from the capstan shaft. In the position shown, the pressing roller 93 is set for holding the record track firmly against a portion of the periphery of capstan shaft 87 so that a non-slip frictional driving engagement effects an impelling of the record track at a substantially constant linear speed corresponding to the speed of rotation of the capstan. As shown, the pressing roller 93 engages the capstan shaft in a position slightly in advance of the point of tangency at which the successive elements of the record track 31 first reach the shaft driving surface. This brings the record track into contact with an appreciable portion of the shaft periphery, increasing the driving contact area and also preventing any tendency of the record track to climb up or down on the capstan shaft because of unavoidable minor dimensional inaccuracies of the impelling elements. The pressing roller 93 may apply resilient pressing forces to the capstan shaft as by forming the pressing roller 93 of suitable plastic composition, or by providing it with a resilient mounting. Because of the comparable speeds between the capstan shaft and the motor shaft 48 the capstan drive may merely be effected by directly coupling the capstan shaft as by flexible coupling to the motor shaft for rotation at the same speed.

When the apparatus is set for transducing the driving connection between the supply reel 21 and the reel shaft drive pulley 66 is open, the capstan drive is engaged and motor 42 is energized. The capstan will accordingly pull the record track at the desired transducing speed, unwinding it from the supply reel 21 and feeding it toward the take-up reel 22. The unbroken driving connection with the take-up reel 22 will cause it to wind up any slack appearing in the record track and keep the record track in the proper record track guide path under a small amount of tension. The driving ratio between the motor shaft 48 and the take-up reel 22 is not fixed at the figure which provides the desired calculated speed of record track take-up, but is merely set at a low power high speed value effective for properly coiling up the record track even though the take-up reel 22 is empty and only beginning to receive the record track and its effective coiling diameter is at a minimum. The variable speed at which the take-up reel 22 tends to pull the record track 31 is effectively dominated by the constant speed drive of the capstan which is in substantially non-slip driving relationship with the record track and impels the record track through the high torque small radius of the capstan shaft 87. The take-up reel drive which has a relatively lower torque due to the step-up drive from small pulley 50 to larger pulley 67 and through the relatively large driving radius of the reel is accordingly permitted to slip at the friction pad connection and/or at the drive through belt 71. The impelled speed of the record track during transducing will accordingly be substantially constant and determined essentially by the speed of the capstan shaft 87.

When the apparatus of Fig. 1 is set for rewinding the record track from take-up reel 22 to supply reel 21, the capstan pressing roller 93 is retracted into inoperative position permitting the record track to pass freely and with very little friction over the surface of the capstan shaft 87, and the clutch slide 74 is inwardly operated. Driving motor 42 is accordingly energized impelling only the supply reel 21 in clockwise direction and winding the record back on it. The drive ratio between the motor 42 and the supply reel 21 may be similar to the step-up driving connection to the take-up reel 22 so that the supply reel tends to be driven at a speed substantially higher than that required for transducing, and in the absence of restraining forces by the capstan drive the record track may be rewound at a speed much higher than that at which it is transduced. The rewinding time may, for example, be of the order of one-twentieth ($\frac{1}{20}$) or one-thirtieth ($\frac{1}{30}$) of the transducing time.

In the form shown, operation of the magnetic recording transducer of Fig. 1 is provided by a transducer control assembly 100 shown as an interconnected set of push button operated control rods 101, 102, 103, 105 and 106. These shafts are slidably mounted between guides 110, 111 and are outwardly biased, as by biasing springs 113, to inoperative positions in which the control shafts 102, 103, 104, 105 and 106 are shown. The push rods 101, 103, 104 and 106 are provided with cam lobes 114 for latching into engagement with a transversely slidable latch plate 116 biased toward the latching position shown by spring 117. The latch plate is slotted as shown at 118 to provide passageways for the cam portions of each of the push rods, and in the inwardly operative position in which the push rod 101 is shown, the outer face of the cam lobe 114 is engaged by a wall of the latch plate bounding the slot 118. Stop projections 120 may be provided on the push rods, as shown, to limit their outward travel by engagement with the wall 110.

When one of the push rods 101, 103, 104 and 106 is actuated from the outer retracted position to the inner operated position, its cam lobe 114 slides the latch plate 116 to the right against the action of its bias, and after complete penetration of the cam lobe latch plate 116 is returned to the position shown, effectively holding the inwardly operated push rod in place. At the same time, the camming action on the slide plate 116 causes it to release any other push rods that were inwardly latched so that non-operated rods are simultaneously returned to their outer inactivated position.

The rods 101 through 105 are labeled, respectively, Forward, Erase, Rewind, Fast forward, Record and Stop. The Forward push rod 101 is provided with extensions by which it is interconnected to initiate a forward or transducing operation. As shown, a pair of transducing control levers 120, 121 are pivotally mounted and arranged for actuation by the Forward push rod extensions to bring the capstan into transducing drive engagement with the record track, to break the driving connection between drive motor 42 and supply reel 41, energize the driving motor and press the record track into suitable magnetic linkage with the magnetic transducing core 36. The transducing control lever 121 is shown as connected through link 123 to the pivoted capstan pressing roller arm 95 for bringing the capstan pressing roller 93 into the engaged position shown against the action of a retracting bias 125 when the Forward push rod is actuated. The transducing control lever 120 is shown as linked to a pivoted clutch operator 127 through connector 129 so that when the control lever 120 is tilted in counterclockwise direction the clutch operator 127 is tilted in clockwise direction and an arm of the operator engages a pin 131 on clutch slide 73 moving the slide to the inward drive disengaging position in which it is shown. The inward movement of clutch slide 73 also closes the contact of switch 87 and energizes driving motor 42. An additional link 133 is connected to the control lever 120 to operate a pivoted pressing pad arm 135 to urge a pressing pad 136 against the action of a bias 134 toward the pole face region of the magnetic transducing core 36 when the Forward push rod 101 is held in the forward position shown. When the Forward push rod is retracted as by inwardly operating the Stop push rod or any of the other push rods, the transducing control levers 120, 121 are released and permitted to return to inoperative position by the retracting action of the biasing means 125, 134 and 77 as they move the capstan engaging roller 93, pressing pad 136 and clutch slide 73 back to the normal positions which they occupy when the transducer apparatus is not operating. The withdrawal of the pressing pad 136 and engaging roller 93 leaves a generous space alongside the transducing head 36 and the capstan 38 along which the record track may be easily threaded in place.

For forward reeling to reach a desired portion of the record track without necessitating a lengthy transducing operation, the Fast forward push rod 104 may be moved to the inward operated position to rotate a fast forward control lever 138 connected through link 140, shown broken away, to the clutch operator 127 for breaking the drive connection of supply reel 21 and energizing the driving motor 42 without impeding the movement of the record track as impelled by the take-up reel 22. The record track is accordingly wound on take-up reel 22 at a speed appreciably higher than the transducing speed, and the selected portion of the record track will be promptly reached. If desired, an additional switching arrangement may be interconnected with the Fast forward push rod 104 for rendering the amplifier inoperative to transduce the signals picked up and fed to it by the magnetic transducing core 36 so that during the fast forward reeling the production of disturbing and highly distorted sound signals is avoided.

The Rewind push rod 103 is associated through an extension with a pivoted rewind control lever 142 connected for moving a rewind clutch operator 144 through link 145. In this manner the inward portion of the Rewind push rod causes the arm of the rewind clutch operator 144 to engage a pin 146 on the rewind clutch slide 74 moving the clutch to the inward position in which it opens the driving connection to reel 22 and closes the contacts of switch 88 energizing the driving motor. The rewinding is accordingly effected at a speed which may be as high as the fast forward reeling speed or even higher.

The recording structure associated with the Record push rod 105 includes a magnetic erasing head 150 held on pivoted arm 152 biased to the retracted position by spring 153 and connected as by link 155, shown broken away, to an erasing control lever 157 cooperating with an extension of push rod 105. A set of switches indicated at 160 is also associated with the Record push rod for shifting the amplifier unit connected with the transducing head 36 from playback to record position. The magnetic erasing head 150 comprises a pair of bar-shaped permament magnets 161, 162 held between mounting wall members 164 adjustably mounted as by the pivot screw 165 passing through the wall members and securing them to ears provided on the erasing arm 152. The wall members 164 may be recessed for securely holding the bar magnets and are provided with guide surfaces shown at 166 so that when the erasing head is moved from the retracted position, shown in full lines, to the erasing position, shown by dot-dash lines, the record track is engaged by the guide surfaces 166 so that it moves past the magnets 161, 162 along a controllable and accurately reproducible guide path. Permanent magnet 161 is so located that when in erasing position the elements of the record track contact its leading edge and then move away and past the second permanent magnet 162 with a gradually increased spacing. Each magnet is polarized longitudinally and their adjacent ends are of opposite polarity, as indicated in the figure, for example, to provide four magnetic fields in the record track guide path, as indicated by the flux lines 170, 171, 172 and 173 in Fig. 2. The relative strengths and locations of the magnets 161, 162 are adjusted so that the first field 170 in the record track guide path is strong enough to substantially obliterate any prior flux variations, and the succeeding fields are of successively alternating direction and gradually decrease in strength so that the elements of the record track are passed through two complete cycles of a decaying alternating magnetic flux. Such erasing action, although not gradual enough for true de-magnetization leaves the record track in a pseudo-demagnetized condition in which it faithfully records flux signals applied by the magnetic transducing core 36, especially when the signals are biased by high frequency alternating flux in a manner well known in the art. The effect of the high frequency bias appears to be not only to collapse the hysteresis loop of the magnetizable elements of the record track so that a substantially linear magnetizing relationship is established for faithful recording, but also to treat the imperfectly demagnetized elements coming from the erasing head as if they were substantially perfectly de-magnetized.

Figure 2:
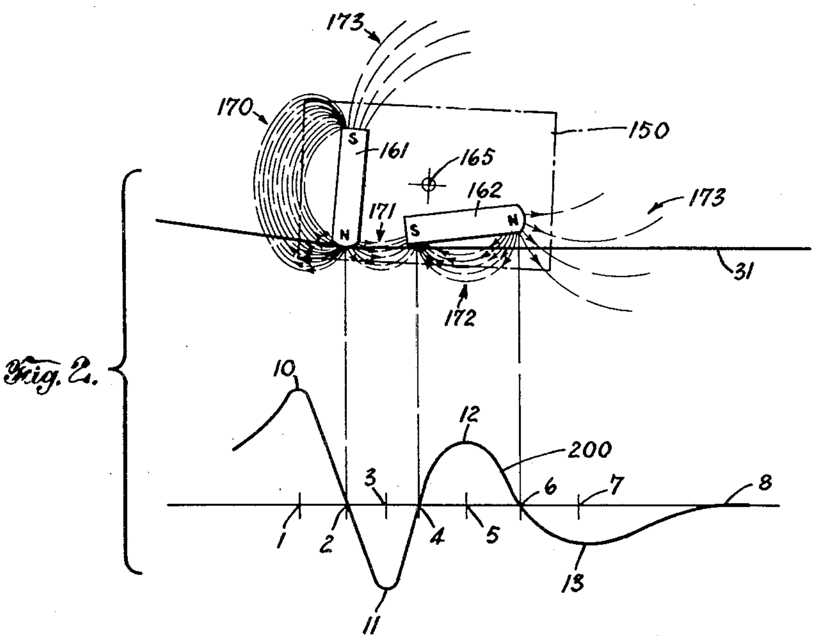
Fig. 2 shows the magnetic fields adjacent one of the erasing heads of the construction of Fig. 1.

Fig. 2 diagrammatically indicates the operation of the obliterating head. In the upper portion of the figure, the magnets 161, 162 together with their flux fields 170, 171, 172, 173 and the passing record track 31, are schematically shown, the lower portion being a graphical representation including the curve 200, of the horizontal components of the respective field intensities impressed on the successive elements of the record track 31 in various positions of the guide path shown in the upper portion. As a track element moves through point 1 of the guide path, a relatively intense magnetic field is impressed upon it in one direction longitudinally of the track. The intensity of this magnetic field is indicated by the peak 10 of the lower curve and is of an amplitude equal to or exceeding that of any previous magnetic history of the record track elements. At point 2, the magnetic field is reversed in direction, the field 171 being opposite to field 170, as shown by the arrow-heads applied to the flux lines in the upper portion of the figure. Point 3 represents the maximum zone of the field 171 to which the record track elements are exposed, this amplitude being indicated by the minimum region 11 of curve 200. At zone 4, the magnetic field is again reversed, and the track elements begin to become exposed to flux field 172, the greatest amplitude of which is shown at point 12 of curve 200, corresponding to location 5. Another field direction reversal takes place at point 6 followed by a second minimum region 7 indicated by zone 13 of curve 200. Further movement along the record track guide path brings the track elements into gradually diminishing regions of field 173, the intensity variation being shown in curve 200 between points 7 and 8. As can be seen in curve 200, the track elements, upon reaching position 4, have completed exposure to an entire cycle of magnetic field reversal and leave the magnetic head at about point 8 after being subjected to a second complete cycle. The successive horizontal field intensities indicated by the maxima and minima 10, 11, 12 and 13 are of progressively decreasing strengths.

Figure 3:
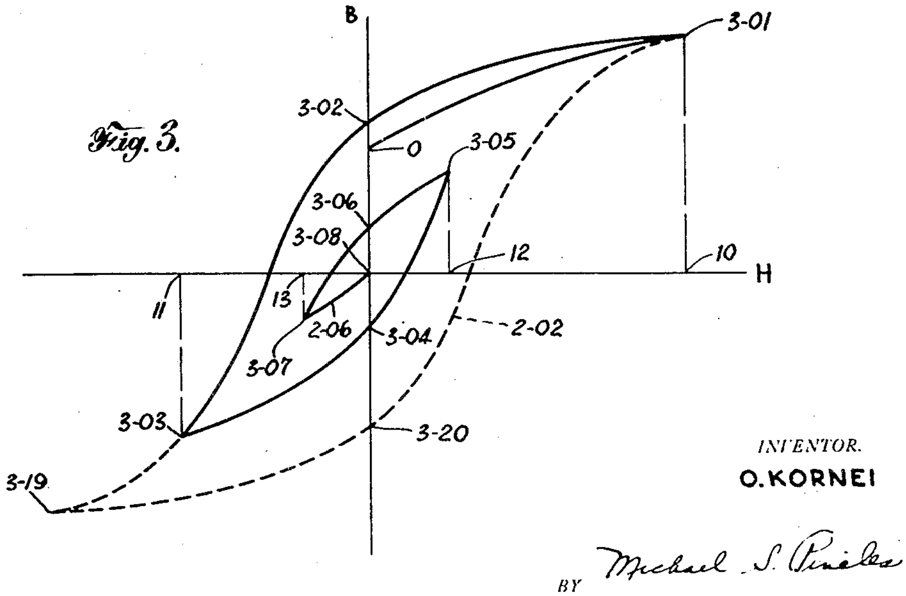
Fig. 3 is a diagrammatic explanation of the obliterating action of the apparatus of Fig. 1.

The result of the above magnetic treatment is graphically illustrated in Fig. 3, which shows a hysteresis loop 202 of the magnetization characteristics of the individual record track elements. The loop is drawn with the horizontal axis indicating the magnetizing forces H to which the elements are exposed, and the vertical axis indicating the flux B induced in the elements upon exposure to such fields. As the track element approaches the obliterating head, it might exhibit a longitudinal flux corresponding to the point 0 on the B-axis, there being no applied magnetizing field H. The effect of the large field intensity 10 at point 1 is to bring the track elements to point 3—01 of the hysteresis loop, which point may be near the saturation point to insure uniform magnetization no matter what the previous history of the track elements may have been. Thus, even if the element were exposed to field intensity 10 with a previously contained flux density ranging anywhere between the points 3—02 and 3—20 corresponding to maximum flux in either longitudinal direction, it will still be brought to point 3—01 on the hysteresis loop. As the track element moves from the maximum 10 in one field direction to a maximum 11 in the opposite field direction, it is carried along the upper branch of hysteresis loop 202, from point 3—01 through point 3—02 corresponding to point 2 of curve 200, and brought to point 3—03 of the hysteresis loop. Because the intensity of field 171 in the guide path is less than that of field 170, as shown by the relative amplitudes of points 11 and 10 on curve 200, the reversed magnetization at point 3—03 is somewhat removed from the reversed hysteresis peak 3—19.

From point 3—03 the track element is carried into the reversed field 172 along a minor hysteresis loop through point 3—04 corresponding to zone 4 of Fig. 2 and to point 3—05 at the maximum intensity region 5. As indicated by the lower field intensity 12, the track element is now beginning its second cycle of reversing magnetization. From here, the track element is brought through point 3—06 corresponding to zone 6 of Fig. 2 to point 3—07 along a still lesser hysteresis loop exposed to the maximum intensity of field 173 indicated at 13. The exit from field 173 brings the track element back to the zero field axis B along the small hysteresis loop 2—06 approximately to the point where it also exhibits no residual flux, as indicated at 3—08.

When the obliterating magnets are bar-shaped as shown, the longitudinal axes of the bars may be approximately perpendicular to each other. Highly effective results are produced with included angles varying substantially from the perpendicular in either direction, at least within the range of from about 60° to about 100°. Best results for a compact type head are obtained with an included angle of 80°. The path of movement of the record track past the magnets is also adjusted for best operation. It has been found that optimum obliteration is produced when the approach path to the first bar magnet 161 makes an angle of about 45° to 90° with the axis of this bar and the departure path from the last bar magnet 162 makes an angle of about 5° with the axis of bar 162. However, there are substantial variations in the effective range of these angles especially when the field provided by the magnets vary in strength, as is not infrequently found to be the case. Excellent obliteration is obtained with any approach angle 90° and with the departure angle ranging between about 3° and about 10°.

One of the features of this obliterating head of the invention is the generous latitude of the approach angle which permits the elimination of the guide member 34 adjacent this head. The head itself may form a guide member, the variation of record track traveling path as it unwinds from the supply reel 21 and comes from points moving closer to the reel axis having no effect on the obliterating action.

Due to the variations among individual erasing heads, the operation of the head may not bring the track elements exactly to point 3—08 of Fig. 3 corresponding to the intersection of the B and H axes. When this is the case, a small amount of residual background noise appears in the record track after the completion of the obliteration.

These variations are compensated, according to a feature of the invention, by making a final adjustment of the obliterating head about its pivotal support 165 to that rotative position in which the residual noise of the record track is at a minimum. The effect of the adjusting rotations is that of raising or lowering residual point 3—08 along the B-axis by a small amount.

The above description has been confined to the horizontal or longitudinal components of the magnetic fields to which the track elements are exposed. Inasmuch as recordings with the apparatus of the invention are effected by longitudinal magnetization of the track elements, any perpendicular or transverse magnetic flux exhibited by the track elements are of minor consideration. However, the obliterating heads of the invention, such as head 160 shown in Fig. 2, exhibit a succession of perpendicularly directed fields whose maxima correspond approximately to points 2, 4, 6 and 8. At these locations magnetic flux is directed generally perpendicularly to the record track guide path. At point 2, it is directed downwardly from the lower north pole of magnet 161. At point 4 it is directed upwardly to the left-hand south pole of magnet 162. At about point 6 the field is again directed downwardly from the right-hand north pole of magnet 162, and at about point 8 the flux of field 173 is directed upwardly in its return path to the south poles of magnets 161, 162. The arrangement of Fig. 2 is accordingly also effective for substantially removing any perpendicular component of magnetic flux from the record track elements in a manner similar to that shown for the horizontal components. A similar and slightly lesser extent of de-magnetization takes place for transverse components. The combined result is a highly effective magnetic obliterating head of very simple construction.

Although the record track elements are brought to the substantially zero residual flux condition corresponding to point 3—08 of Fig. 3, they are not in a truly de-magnetized condition because of the fairly abrupt arrival at this condition from the highly magnetized condition at point 3—01, and the track elements will therefore be in a pseudo-demagnetized condition in which they exhibit some effects of their previous history. A minimum of three cycles of decaying magnetization reversals is usually required for an approximately perfect de-magnetization. According to the invention, however, the magnetic record transducing system, by providing high-frequency alternating magnetic flux bias to the signals to be magnetically recorded on the track elements, causes the signal recording to take place in a manner substantially identical with that of a perfectly de-magnetized record track.

The control structure of the invention is also arranged for the prevention of inadvertent erasures or recordings, as for example, by accidental operation of the Record push button while a record track is held in the guide path. In the form shown, the Record push rod 105 is provided with an interacting latch projection 180 having generally rectangular edges 181, 182 for engagement with either side of the latch plate 116. In the outward non-operated position of the Record push rod, in which it is shown, the inner edge 181 of the latch projection 180 extends behind a barrier portion of the latch plate 116 and securely locks the Record push rod against inward operation either intentionally or inadvertently. However, when a record operation is to be performed both the Forward and Record push rods 101 and 105 may be inwardly actuated simultaneously by manually pushing them inwardly together. The inward travel of Forward push rod 101 causes its cam lobe 114 to cam the latch plate toward the right, moving the slot 118 surrounding the Record push rod in front of the inner edge 181 of the latch projection and permitting inward travel of the Record push rod. Both push rods can accordingly be moved to their inner operated positions permitting the latch plate 116 to be retracted behind the cam lobe 114 of the Forward push rod and the latch projection 180 of the Record push rod. These controls are thereby latched in place and set for a recording operation. Recording may be continued until any of the other push rods are inwardly operated, camming the latch plate 116 to the right and releasing both inwardly operated push rods 101, 105. During playback operation when only Forward push rod 101 is inwardly actuated, as shown, the Record push rod cannot be operated because of the engagement of the latch plate 116 with the latch projection edge 181.

The above control arrangement renders it impossible to unintentionally operate the Record push rod 105 during any reeling operation, and accordingly prevents any improper magnetic engagement between the erasing head 150 and the record track 31. Such engagement if inadvertently effected during a high speed reeling operation, for example, could easily result in the erasure of a considerable length of the record signals and ruin the recording which may be desired to remain intact. Furthermore, the Record push rod cannot be inwardly operated without an additional accompanying push rod so that even when the record track 31 is held stationary in its guide path the erasing head cannot be brought into engagement with any portion of the record signals.

Inasmuch as the push rod 105 is unblocked only after some amount of inward travel, manual operation of both push rods 101, 105 by the fingers of one hand is quite awkward and well nigh impossible because of the variation in timing of the pushing impulses necessary to be supplied by the different fingers. Thus, if the operating impulse applied to the Record push rod 105 is a little too late, the Forward push rod 101 will have moved in far enough to permit retraction of the latch plate 116 into the latching position shown blocking the latch projection 180. If the Record push rod operating impulse is a little too early, it only causes the latch projection edge 181 to press against the latch plate 116 and increase the friction of the latch plate camming action to be effected by the cam lobe 114 of the Forward push rod 101 so that a larger impelling force must be supplied to the Forward push rod. Simultaneous operation of the Forward and Record push rods is most simply performed by using the fingers of different hands so that the operating impulses can be nicely timed. The rectangular latch projection edge 181 may be made relatively short, as shown, so that only a small travel of the Forward push rod 101 is sufficient to unblock it. The short edge 181 may taper into the body of the latch projection, as shown, so that after the small unblocking action necessary, inwardly operating forces applied to the Record push rod 105 will assist in camming the latch plate 116 to the right.

The magnetic record transducer of Fig. 1 is accordingly proof against any unintentional damage to recorded signals. The erasing head 150 can only be brought into engagement with the record track 31 by deliberate and careful operation of both Forward and Record push rods. Accidental operation is substantially impossible, even when the operator's hand inadvertently presses against the record push button.

The interlocked control structure of the invention may also be operated for instantaneously converting from a playback to a recording operation, as for example, when it is desired to edit, erase or add comment to a previous recording. It is only necessary during the playback operation, with the controls set in the position shown, that the Forward push rod 101 be held in while another push rod, such as the Fast forward push rod 104 or the Stop push rod 106 be inwardly operated to unlatch and permit inward travel of the Record push rod 105. By this procedure, the editorial material may be added while the record track is moving smoothly and uninterruptedly along the guide path. The Stop push rod 106 may merely be arranged for camming the latch plate 116 to the right for releasing other push rods when desired. Alternatively, a switch for breaking the energizing circuits of the motor 42, or the transducing amplifiers, may be mounted for operation by inward travel of the Stop push rod 106. With the latter arrangement, editing may be accomplished by utilizing the unblocking action of the Fast forward push rod 104, which permits slow forward reeling to be continued by the inwardly held Forward push rod 101.

The form of the invention shown in Fig. 1 includes an additional Erase push rod 102 combined with mechanism for accurately making spot erasures at any desired portions of the recording. As shown, the Erase push rod 102 is similar to the other push rods except that it is not provided with a cam lobe 114. The push rod 102 is connected through spot erasing lever 180 and link 181 with a pivoted spot erasing arm 183 holding an auxiliary erasing head 185. The spot erasing arm 183 shown pivoted at 184 is biased, as by spring 186, to a retracted position in which it is kept out of magnetic engagement with the record track 31 moving in its reeling guide path. Upon operation of the erasing push rod 102 into the inward position in which it is shown, the auxiliary erasing head 185 is pulled into the record track engaging position shown. Although the obliterating head 150 is highly effective for preparing the record track elements for receiving a recording, as described above, and is quite simple in construction, it does have the drawback that the span of magnetic fields which it provides extends over a relatively large longitudinal distance which may be of the order of an inch or more. Accordingly, before an element of the record track is properly erased and is emerging from zone 8 shown in Fig. 2, the strong magnetic field at zone 1 has already obliterated the recording from a portion of the record track quite distant from the completely de-magnetized zone which may include a portion of the recording which it is desired not to be erased.

According to the invention, the auxiliary magnetic erasing head 185 is provided for spot erasing and is arranged to exhibit an external flux field compact enough to limit the erasing action to an exceedingly short longitudinal portion of the record track. The construction of spot erasing head 185 shown in Fig. 1 includes a plurality of thin generally bar-shaped permanent magnets 190, 191, 192 held in a housing 195 and spaced by separator plates 197. The three magnets shown in this form are polarized longitudinally in alternating directions and arranged for mounting and engagement perpendicularly with the record track. The edges of the bar magnets facing the record track 31 may be tapered as shown at 198 so that the record track leaving a magnet pole is exposed to a smaller flux field than when approaching the same pole. The successive tapered edges 198 may be spaced at increasingly greater distances from the record track guide path, and the corresponding magnet bars may be magnetized to smaller degrees of polarization for providing gradually diminishing field strengths in a manner similar to that shown in connection with the magnetic obliterator head of Fig. 2. With this arrangement spot erasures may be made on portions of the record track as small as one-quarter (1/4) of an inch, with sharp delineation between erasures and adjoining non-erased signals. Thus, for example, the magnet bars 190, 191, 192 may be of generally sheet-like form having a thickness of the order of one-sixteenth (1/16) of an inch or less. The housing 195 may include portions formed of highly permeable material for preventing the spread of the magnetic fields longitudinally along the record track guide path and for concentration of the field produced between the record track-facing pole of magnet bar 190 and the approaching portions of the record track.

Another feature of the invention is the positioning of the spot erasing head 185 along a portion of the record track guide path through which the track elements move after they have passed the magnetic transducing core 36. As so arranged, spot erasing may be effected while the apparatus is playing back a recording, as by pressing and holding in the erasing push rod 102. The signals erased will be those signals which have just been reproduced through the transducing core 36 a fraction of a second earlier, so that it is merely necessary to actuate the Erase push rod 102 just after the undesired signals appear in the signal reproducer, and keep the push rod down until just after the last of the undesired signals has been reproduced.

The apparatus of the invention is arranged for interlocking the Erase push rod 102 with the Forward push rod 101 so that erasing cannot be inadvertently effected. As shown, a pivoted catch lever 210 provided with a latching nose 212 is positioned adjacent an extension of the Erase push rod 102 and biased as by spring 214 to the latching position in which the nose 212 prevents inward movement of the Erase push rod. A link 216 connects the catch lever 210 with the capstan engaging lever 121 associated with the forward push rod 101, so that when the Forward push rod is held in inward operating position in which it is shown, the catch lever 210 is pivoted in counterclockwise direction, unblocking the Erase push rod. Accordingly, during a forward reeling, as for transducing recordings on track 31 with the controls in the position shown, any desired portion of the record signals may be removed by merely operating the Erase push rod to the inward position in which it is shown. During other reeling operations, as for rewinding or high-speed forward reeling, the Erase push rod is securely latched in inoperative positions so that it cannot be actuated. During the latter types of reeling operations, spot erasures can neither be made nor monitored with any degree of accuracy, so that the complete prevention of such erasures ensures satisfactory operation.

When it is desired to edit, or to insert substitute signals for the portion erased, as by the spot erasing head 185, audible monitoring is not practicable, and in a great many instances the substitute signals are not properly located, either over-running the adjoining portions of the unerased signals or spaced from them by an annoying silent gap. In accordance with the invention, these effects are overcome by incorporating a marking mechanism for automatically applying a visible mark to the record track at those points erased. As shown in Fig. 1, the marking mechanism includes a marking arm 218 pivoted as indicated at 220, and provided at one end with a cam-shaped surface 220 for engagement with and operation by a cam ear 222 fixed to an extension of the erase push rod 102. The marking arm 218 may be biased as by spring 224 to a retracted limit position fixed by stop pin 226. The portions of the arm adjacent the record track guide path hold a marking roller 228 which may contain a marking ingredient such as ink, a portion of which is transferred to the record track every time the marking roller 228 contacts it. The cam surface 220 may have a projecting lobe portion 219 bound by recessed portions arranged so that when the erase push rod 102 is in either its outer inoperative or inner erasing position, the push rod ear 222 fits into the recesses on one side of the lobe 219 or the other, but during the inward or outward travel of the push rod 102, the ear 222 engages the cam lobe 219 and tilts the marking arm into marking engagement with the record track. The record track is accordingly marked at the beginning and at the end of every spot erasure, but not marked unnecessarily during the main body of the erasure.

For the addition of a substitute recording, the erased portion of the record track may merely be rewound onto supply reel 21, then reeled forwardly with the apparatus set for recording, and the addition of the desired signals commenced when the first erasure mark reaches the transducing core 36, and terminated before the passage of the next mark. A substantial length of the record track path from the supply reel 21 to the transducing core 36 may be arranged to be open for viewing by the operator so that he is alerted for timely editing at a preliminary appearance of the erasure marks in a particular zone.

For prevention of interference by the preliminary obliterating head 150, a restraining arrangement may be provided, as by including in its operating link 155 an extensible spring portion 154 and locking the erasing arm 152 in the retracted position shown in full lines when substitute signals are to be inserted.

Although three independent permanent magnets 190, 191 and 192 are shown in the spot erasing head 185, substantially the same erasing fields are provided by substituting for the intermediate permanent magnet 191 a sheet of magnetic material. Adjusting of the operating characteristics of low coercive force the erasing head may be arranged by having the magnet 192 either with or without any of the other magnets, slidably mounted along its own longitudinal axis so that it can be clamped in place, as by the mounting bolts shown, in the desired location in which it leaves a minimum background noise on the record track elements.

According to a further embodiment of the invention, the magnetic record transducing apparatus such as shown in Fig. 1, may be provided with a single obliterating head such as that shown at 150 or at 185, and the controls may be arranged for keeping this head out of magnetic linkage with the record track except when erasing or recording, as desired. For normal recording, the head may be arranged to engage the record track in advance of the magnetic transducing core 36, and for spot erasing the same head may be moved into contact with the record track after it leaves the core 36. For such construction the obliterating head may, for example, be held on an arm pivoted so as to rotate and bring the core into either of these erasing positions. Linkages such as those shown at 155 and 181 in Fig. 1 may be arranged for similarly actuating the selectable erasing head arrangement.

The magnetic record transducing apparatus of the invention may utilize an obliterating magnetic flux field produced by electromagnets instead of the permanent magnets described above. The electromagnets may have magnetically permeable cores generally similar in shape to those shown in Figure 1 for permanent magnets 161, 162, and may carry windings through which electric currents may be passed for generating the desired flux. According to this modification, when erasing is not desired, the passage of energizing current through the erasing magnet windings may be stopped, discontinuing the generation of flux so that the erasing head will have substantially no effect on the record track and need not be withdrawn in the manner shown in connection with the construction of Fig. 1. The electromagnet core materials used in this form of the invention may be selected to have a low magnetic remanence so that when the energizing current through the magnet windings is interrupted, the flux immediately drops to a residual value low enough to exhibit no adverse effects on the record track movement across the magnets.

The electromagnets of such erasing head may be energized by either A. C. or D. C. current, the use of low frequency alternating current such as the conventional 60 cycle power supplied commercially makes a very effective construction and enables the use of electromagnet cores having larger magnetic remanence. The fairly rapid alternations in the flux field operate to leave the core with much less flux density than a corresponding direct current energization. To ensure a substantially perfect de-magnetization of the erasing head cores, the energizing or de-energizing circuits may be arranged for exposing the cores to a decaying alternating flux of at least about 3 cycles, each time the energizing current is interrupted. Thus, for example, the actuation of the obliterating operation may be connected for simultaneously charging a condenser which, when the obliterating core windings are de-energized, automatically discharges through the windings. This discharge is of the nature of an oscillatory decaying alternating current having a frequency to which the capacitance and inductance of the discharging circuit is resonant. By selecting a discharging condenser of the proper capacitance, the discharging current may be tuned to a point of relatively high Q or oscillation efficiency, thereby ensuring that the number of discharging cycles is large enough to produce the required gradual decay. A simple arrangement for providing this obliterating core de-energizing action consists of a storage and discharge condenser directly connected across the windings of the obliterating electromagnet. The passage of energizing direct current through the windings charges the condenser and upon opening the energizing circuit connection to the combined winding and condenser, the desired discharge will automatically occur.

The form of magnetic record transducing apparatus shown in Fig. 1 includes a limit control arrangement for automatically terminating a reeling operation at predetermined points. As shown, the take-up reel 22 has its hub slotted at 230 for admitting a sensing nose 232 held on a limit slide 234 guided for horizontal travel along the reel table 56, as by guides including a fixed guide 238. The slide 234 may be biased in the radially outward direction as by the spring 240 together with the centrifugal force which it experiences during reeling. The outward bias serves to urge the sensing nose 232 out against the innermost turns of the record track 31 coiled on the reel 22, and also brings the outer end of the slide 234, shown in plan view at 243, out far enough for engagement with a stationary limit lever 245. The end 243 may have a tapered edge 244 so that when the reel 22 is rotating in counterclockwise direction, the tapered edge 244 on engaging with the limit lever 245 merely causes the limit slide 234 to move radially inwardly. When the take-up reel 22 is rotating in the clockwise direction, as for re-winding, projection of the slide end 243 as by the complete unreeling of the record track from that reel, causes a different non-camming edge to engage the limit lever 245, rotating it around a pivot 246 away from stop 248 against the action of a bias 247. This tilting action is transmitted through a link 250 and a trip lever 251 engaging a pin 252 on the latch plate 116 of the control assembly for moving the latch plate 116 to the right, unlatching any inwardly operated control rods and terminating the reeling.

A similar limit control arrangement is provided for the supply reel 21. However, instead of the supply reel limit being responsive to a complete unwinding of the record track from this reel, it is arranged for terminating the reeling while an anchoring portion of the record track still remains wound thereon. As shown in the figure, this limit construction includes a tilting limit arm 254 which may be pivoted on the reel table 56 and provided with a sensing nose portion 256 biased upwardly as by suitably distributing the mass of the arm 254. The sensing nose 256 may be located in a position where it engages some of the turns of the record track 31 a short distance removed from the innermost turns through one of the slots 64 in the flange portion of the reel. The outer portions of the limiting arm 254 are shown as including a depending lip 260 having a tapered edge 262 for co-action with a second limit lever 265 pivoted as at 266 and urged toward a stop position against pin 267 by spring 268. The forward reeling limit lever 265 is connected through link 270 with a second pivoted trip lever 272 arranged for engaging a pin 274 on the latch plate 116.

The forward reeling limit is accordingly similar to the rewinding reeling limit associated with take-up reel 22. When the supply reel 21 is rotated in the clockwise or rewind direction, the tapered edge 262 of the limit arm 254, upon engaging the limit lever 265, merely causes the limit arm 254 to tilt and ride over the limit lever. However, when the supply reel 21 is rotated in the counterclockwise or forward reeling direction and a sufficient amount of the record track is unwound to permit upward movement of the sensing nose 256, the tilted limit arm 254 brings a non-camming edge of the ear 260 into engagement with the forward limit lever 265, rotating it and thereby unlatching any inwardly held push rods stopping the reeling.

The forward reeling may be arranged so that even at the high speed with which fast forward reeling is effected, the arresting action is completed before all of the record track is unwound. In this way the rewinding may be readily made by simply operating the rewind push rod 103 without any further record track threading or anchoring operations.

It will be apparent to those skilled in the art that the novel principles of the invention disclosed herein in connection with specific exemplifications thereof will suggest various other modifications and applications of the same. It is accordingly desired that the invention shall not be limited to the specific exemplifications described herein.

I claim:

1. In a magnetic record transducing apparatus for magnetically recording by transducer head means signals of the audio frequency range with a superposed alternating bias field of at least twice higher frequency on a flexbile elongated permanently-magnetizable record track guided and impelled in a transducing forward direction along a predetermined guide path and for reproducing the recorded signals with said head means located along said path: an erasing head comprising permanent magnet means having at least three permanent magnetic poles, a base, means securing said permanent magnet means to said base forming a unitary structure, means adjustably connecting said erasing head to said record transducing apparatus adjacent the guide path for erasing and magnetically substantially neutralizing elements of said track before they reach said head means while recording; said erasing head comprising a permanent magnet structure free from any extraneous magnetizing windings and having an elongated exposed pole region of said at least three poles past which said track moves along said guide path for producing solely by said permanent magnet structure along an erasing path section of said guide path extending in front of said poles an erasing magnetic flux field of at least three oppositely directed portions decaying in intensity in the forward direction of said guide path, starting with an initial portion of intensity sufficient to magnetically saturate track elements passing therethrough and ending with an end portion of low intensity effective in reducing the magnetization of passing particles to a negligible level, a portion of said permanent magnet means constituting a guide element positioned in the said initial maximum intensity portion of said erasing flux field engaged by and guiding the track along said erasing path section for saturating track elements coming into engagement with said guide element.

2. In a magnetic record transducing apparatus as claimed in claim 1, said apparatus also having control means actuable to cause said transducer head means to carry on with said track either a recording operation or a reproducing operation in each of which operations said track moves at a transducing speed, said control means being also selectively actuable to cause said track to be impelled at a higher non-transducing speed in a non-transducing operation, said control means also including setting means having setting elements selectively settable to either one of a plurality of settings including a recording setting or reproducing setting whereby said control means is selectively set to cause said apparatus to perform either said recording operation, or said reproducing operation, means movably connecting said erasing head to said transducing apparatus, means biasing said erasing head to remain and return to retracted position in which said record track is substantially free from the action of said erasing field and being movable to an erasing position in which it subjects said track to said erasing action, and means operative in response to setting of said setting means to a recording setting for causing said erasing head to be moved to and retained in said erasing position while said setting means is in a recording setting only, said erasing head being actuated to return to said retracted position in response to actuation of said setting means from said recording setting to any other setting.

3. In a magnetic record transducing apparatus for magnetically recording by transducer head means signals of the audio frequency range with a superposed alternating bias field of at least twice higher frequency of a flexible elongated permanently-magnetizable record track guided and impelled in a transducing forward direction along a predetermined guide path and for reproducing the recorded signals with said head means located along said path: an erasing head comprising permanent magnet means having at least three permanent magnetic poles, a base, means securing said permanent magnet means to said base forming a unitary structure, means adjustably connecting said erasing head to said record transducing apparatus adjacent the guide path for erasing and magnetically substantially neutralizing elements of said track before they reach said head means while recording; said erasing head comprising a permanent magnet structure free from any extraneous magnetizing windings and operative to produce solely by said permanent magnet structure along an erasing path section of said guide path an erasing magnetic flux field comprising a plurality of oppositely directed unidirectional field portions; said apparatus also having control means actuable to cause said transducer head means to carry on with said track either a recording operation or a reproducing operation, in each of which operations said track moves at a transducing speed, said control means being also selectively actuable to cause said track to be impelled at a higher non-transducing speed in a non-transducing operation, said control means also including setting means having setting elements selectively settable to either one of a plurality of settings including a recording setting or a reproducing setting, or to a non-transducing setting whereby said control means is selectively set to cause said apparatus to perform either said recording operation, or said reproducing operation, or said non-transducing operation, means movably connecting said erasing head to said transducing apparatus, means biasing said erasing head to remain in and to return to a retracted position in which said record track is substantially free from the action of said erasing field, means for moving said erase head to an erasing position in which it subjects said track to said erasing action; and means operative in response to a setting of said setting means to a recording setting for causing said erasing head to be moved to and retained in said erasing position while said setting means is in a recording setting only, said erasing head being actuated to return to said retracted position in response to actuation of said setting means from said recording setting to any other setting.

4. In a magnetic record transducing apparatus as claimed in claim 1, one pole of said magnet structure constituting the guide element.

5. In a magnetic record transducing apparatus as claimed in claim 4, said magnet structure comprising two distinct generally bar-shaped permanent magnet members having poles at their ends.

6. In a magnetic record transducing apparatus as claimed in claim 5, the poles of one of the two magnet members being spaced from said erasing path.

7. In a magnetic record transducing apparatus as claimed in claim 1, said magnet structure comprising two distinct generally bar-shaped permanent magnet members having poles at their ends.

8. In a magnetic record transducing apparatus as claimed in claim 7, the poles of one of the two magnet members being spaced from said erasing path.

OTTO KORNEI.

REFERENCES CITED

The following references are of record in the file of this patent:

UNITED STATES PATENTS

| Number | Name | Date |
|---|---|---|
| 1,828,190 | Kiliani | Oct. 20, 1931 |
| 2,086,130 | Hickman | July 6, 1937 |
| 2,105,016 | Smith | Jan. 11, 1938 |

FOREIGN PATENTS

| Number | Country | Date |
|---|---|---|
| 22,468 | Switzerland | Aug. 31, 1900 |
| 322,252 | Germany | June 24, 1920 |
| 883,022 | France | June 22, 1943 |